United States Patent Office 3,117,591
Patented Jan. 14, 1964

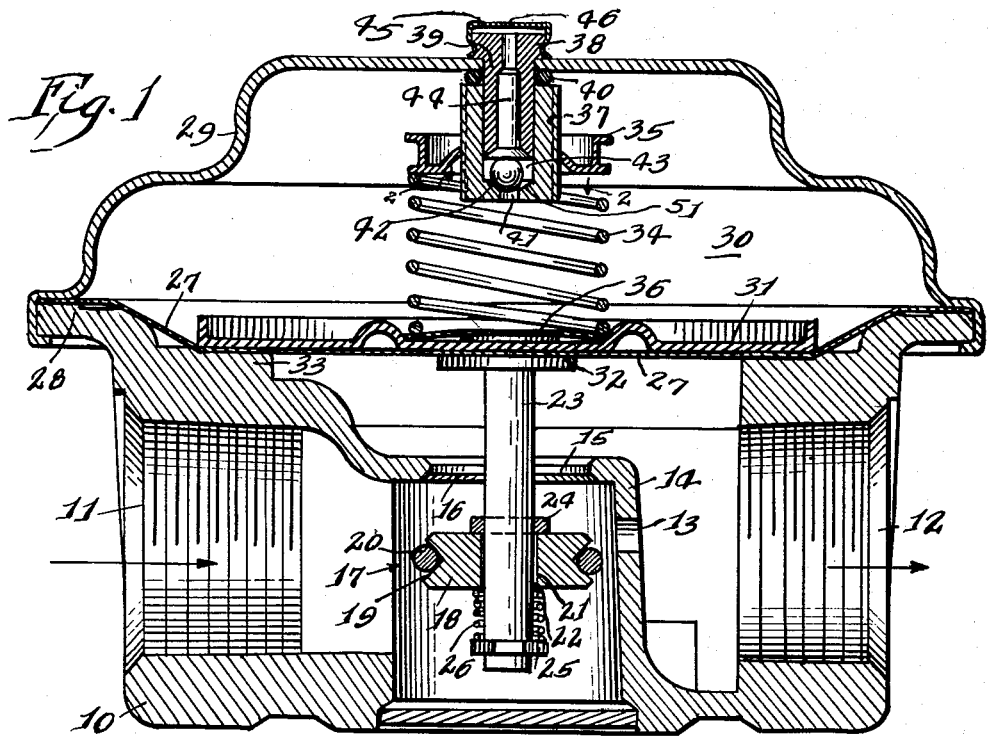
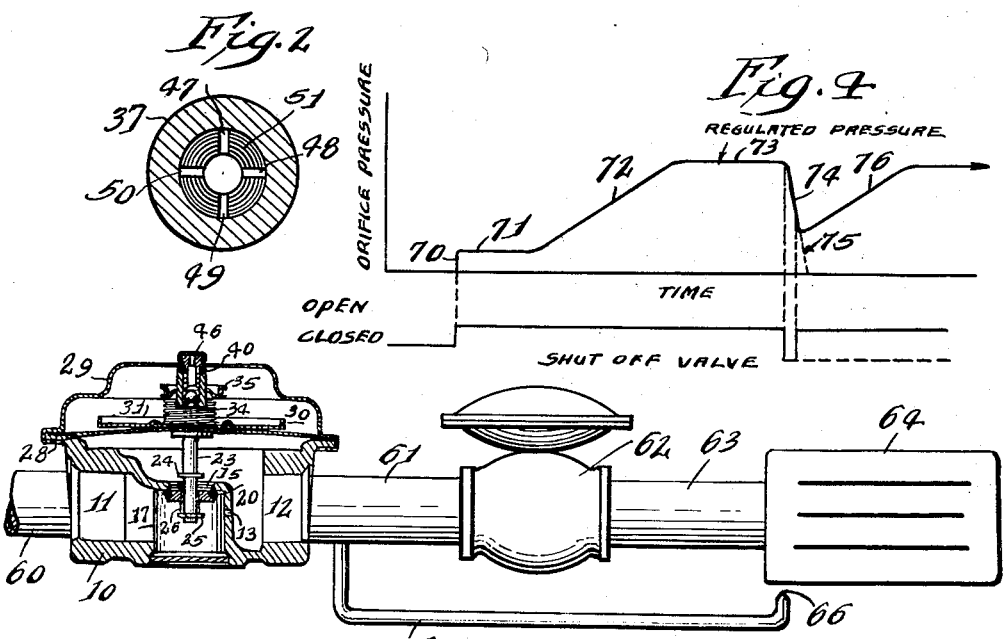

3,117,591
DELAYED STEP OPENING GAS REGULATOR
Wayne H. Schutmaat, Needham, Mass., assignor to
Penn Controls, Inc., a corporation of Indiana
Filed Aug. 29, 1960, Ser. No. 52,421
5 Claims. (Cl. 137—505.41)

This invention relates to step opening gas regulators and valves and more particularly to delayed step opening systems.

Modern trends in home construction have resulted in small space for heating plants and, in turn, smaller heating plants with even smaller combustion chambers while accompanied by increasing demands for elevated output. Consequently, several undesirable ignition characteristics of gas space heating equipment have been created.

When space heating equipment incorporating a small combustion chamber is provided with a normal gas pressure regulator and an automatic main gas control valve of a snap-acting type, the introduction of too much gas into too small a space in too short a time results in an undesirable flame roll-out from the secondary air ports. Severe flame turbulence may extinguish the pilot. If the regulator is provided with means for delaying its operation, the gas may be introduced more gradually into the combustion chamber so as to obtain a more gradual build-up of the flame, but with such a control it is likely that the flame will flash back and burn at the orifice, and, furthermore, there would be a similar slowdown of combustion when the main valve is closed and there is likely to be a loud "pop" as the flame is extinguished.

The use of two-stage valves normally provides an immediate initial ignition, a small port opening first to rapidly establish initial ignition, followed by the opening of a second port which will provide a full flame. Here, again, if the second port is opened too fast, the probability of roll-out would still exist, and if means is provided for slowing down the opening of the second port and this means also functions to slow down the closing of the second port, problems similar to those heretofore described would still occur.

It is the general object of this invention to provide a pressure regulator for gas furnaces having provision for passing a relatively small volume of gas for immediate initial ignition and a large volume regulating valve having means for delaying the opening of the valve until the burner is adequately burning and then controlling the opening movement of the valve to permit a gradual build-up of the flame together with means for permitting the valve to close quickly when the burner is shut down.

Another object is to provide a new and improved regulator providing for slow opening of the regulator valve subsequent to opening of the main burner valve and fast closing of the regulator valve.

It is a further object to provide a regulator valve operable in such a manner as to create an optimum ignition-extinction pattern for a gas burner and particularly such a valve which will provide a repetition of said pattern for subsequent starts whether immediate or delayed.

FIGURE 1 is a sectional drawing through the center of the step opening gas regulator with the regulator valve open.

FIGURE 2 is a cross section of the check valve seat taken along the line 2—2 in FIGURE 1.

FIGURE 3 shows a typical arrangement of step opening gas regulator with valve closed, main burner, pilot, and shut off valve.

FIGURE 4 is a curve of the optimum ignition, regulation and extinction curve for a gas burner.

As shown in FIGURE 1 the invention comprises a generally round body 10 having an inlet port 11, an outlet port 12 and a bypass port 13 and a valve port 15 therebetween formed in a wall 14, which otherwise separates the outlet from the inlet. The port 15 is provided with an annular and beveled valve seat 16. A regulating valve 17 comprises a circular disc 18 which is provided with a V shaped peripheral groove 19 in which a rubber O ring 20 is seated and forms the part of the valve which cooperates with the seat 16 to regulate the flow of gas through the valve port 15. The disc 18 has a central bore 21 and is mounted on a cylindrical portion 22 of a valve stem 23 so as to be slidable thereon between a collar 24 and a second collar 25. A coiled spring 26 is positioned around the stem between the disc 18 and the collar 25 so as normally to press the disc against the collar 24.

The valve stem 23 is supported and operated by a flexible diaphragm 27, the outer edge of which overlies the annular upper edge 28 of the body 10 and is secured thereto by a cover member 29. As illustrated in the drawings, FIGURES 1 and 3, the edge of the cover is crimped over the edge of the body to secure the parts together and to form an air chamber 30 above the diaphragm.

A circular plate 31 is secured to the upper end of the stem 23, the diaphragm being sealed to the stem between said plate and an annular flange 32 on the stem. In the wide open position shown in FIGURE 1, an intermediate portion of the diaphragm rests against an annular ledge 33 in the body 10.

A coiled spring 34 is positioned between an adjusting plate 35 and a rubber friction washer 36 placed against the top of the plate 31. The plate 35 has a screw threaded central aperture receiving an adjusting screw 37 which is pressed on and carried by a bushing 38. Bushing 38 is rotatably supported in an aperture 39 in the cover 29. A rubber O ring 40 is positioned between the cover and the upper surface on the screw 37 to seal the parts together.

Means is provided to modify the action of the diaphragm under the action of the spring 34 and the gas pressure on the bottom surface of the diaphragm 27. This means is operable to permit rapid closing of the valve when the main burner is shut off and the pressure against the diaphragm rises, and to cause a delay in starting the opening of the valve when the main burner is turned on and to regulate the opening movement of the valve after it starts to open.

As shown, this means includes an exhaust port 41 for the chamber 30, formed in the lower end of the screw 37 and controlled by a nylon ball valve 42, positioned in a chamber 43. A port 44 extends through the bushing 38 and a cap 45 on the bushing has a hole 46 to complete communication from the chamber 30 to the atmosphere external of the cover 29, when the check valve 42 is open.

As the regulator is designed for use in a vertical position as shown in FIGURE 1, the valve 42, under the action of gravity, normally closes the port 41. Being relatively lightweight, as when made of nylon, the valve is readily unseated to open the valve when the diaphragm 27 moves upwardly.

As shown in FIGURE 2, control grooves 47, 48, 49, and 50 are cut in a check valve seat 51. At any time the diaphragm 27 attempts to move downward, the nylon valve 42 is firmly seated on the valve seat 51. In this position the valve and the four grooves in the valve seat 51 form four ports which allow a slow return flow of air into the chamber 30, thereby allowing the regulator valve to open at a slow rate, which may be predetermined by the size and number of the control grooves.

Referring now to FIGURE 3, a supply of gas is fed under pressure through a gas pipe 60 to the inlet passage 11 of the regulator body 10. Outlet passage 12 is connected to a pipe 61, whose other end is connected to a shut off valve 62. A gas line 63 connects the discharge side of shut off valve 62 to a burner 64. A pilot line 65 is connected to the pipe 61 for the purpose of supplying gas to a pilot burner orifice 66.

For better understanding of the present invention reference is made to the optimum ignition, regulation and extinction curve illustrated in FIGURE 4. A portion 70 of the curve illustrates the rapid build up to a small flow rate to the burner for the purpose of preventing flashback by almost immediate initial ignition. This is accomplished in the present invention by opening "shut-off" valve 62 which permits a small flow of gas to reach burner 64 through bypass 13. The opening of "shut-off" valve 62 creates a drop in gas pressure in the outlet passage 12. FIGURE 3 shows the regulator valve closed. With reduction of gas pressure on the lower side of diaphragm 27, it moves downward under the force of spring 34. The downward speed of diaphragm 27 and stem 23 is controlled by the rate of air flow through the groove ports in the check valve seat 51. During the initial downward movement of stem 23, it slides through disc 18 as spring 26 expands and maintains disc 18 in position with O ring 20 firmly seated in valve seat 16. Until collar 24 contacts disc 18 the flow to burner 64 is controlled by the size of bypass 13. This portion of the ignition cycle is illustrated by a low gas flow rate 71 on the optimum curve of FIGURE 4. This low flow rate 71 is generally maintained for a period of 10 to 30 seconds. Once the initial flow rate portion of the curve is completed, collar 24 carries valve 17 downward with valve stem 23. Thus valve 17 moves at a slow rate controlled by the port areas in the check valve seat 51 providing for the gradual increase in gas flow rate to the burner 64. This action accomplishes a slope portion 72 of the optimum curve. The length of time required for slope portion 72 may be of the order of five to forty seconds. When the gas flow rate through port 15 has increased to the desired level the gas pressure in outlet passage 12 will balance the spring force of spring 34 against the opposite side of the diaphragm 27. Then the regulator will commence to regulate the flow rate to burner 64 as illustrated by portion 73 of FIGURE 4.

The rapid drop in flow rate for the purpose of eliminating extinction "pop," illustrated by portions 74 and 75 of FIGURE 4, is initiated by closing shut off valve 62. This action raises the outlet pressure rapidly until it approaches the pressure in the inlet passage 11. This sudden increase in pressure forces diaphragm 27 upward. Check valve 42 is forced off its seat allowing the air from chamber 30 to escape rapidly. Valve 17 therefore moves rapidly to its closed position as shown in FIGURE 3.

Upon occasion shut off valve 62 may be reopened shortly after closing and before valve 17 has fully closed. It is desirable as shown in FIGURE 4 by an optimum curve portion 76 to be able to bring the gas flow rate to the burner 64 back up to the full regulated flow rate 73 without first extinguishing the burner and reigniting it. This immediate return to full regulator flow rate is accomplished by the present invention. At any time the shut off valve 62 is closed and reopened before valve 17 has had sufficient time to close, the movement of diaphragm 27 and stem 23 is immediately reversed and check valve 42 seats in order to provide a slow return to flow regulated gas flow as shown at curve portion 76.

The attachment of pilot line 65 to pipe 61 is not a requirement of the present invention for line 65 could equally well be connected directly to the source of gas supply or to pipe 60. However if it is connected as shown in FIGURE 3 to any point beyond bypass 13 pilot burner orifice 66 must be small in relation to bypass 13 so that the outlet pressure can approach the inlet pressure whenever valve 62 is closed.

Although the figures show a preferred embodiment of the present invention many other arrangements of the components described and illustrated herein are within the broad scope of the invention.

I claim:

1. A gas valve assembly, comprising in combination, a body having inlet and outlet passages, a main control port therebetween for passing a flow of gas, a valve for controlling the rate of flow of gas through said main port, means for supporting and operating said valve to obtain a rapid closing when the gas pressure in the said outlet passage approaches the gas pressure in said inlet passage and to obtain a delayed and slow opening subsequent to a drop in outlet passage pressure relative to inlet passage pressure comprising a diaphragm, a stem for the valve secured to said diaphragm, a spring backing the diaphragm and acting to move said stem to open said valve, a cover for the spring and adjacent side of the diaphragm forming a normally closed chamber over the diaphragm, said valve being slidably supported on said valve stem to permit said diaphragm and valve stem to move toward said cover substantially beyond the position initially closing said valve, a check valve device for permitting quick escape of air pressure from said chamber and thereby permitting rapid closing of said valve, and means for controlling the rate of air flow into said chamber.

2. A step opening gas regulator, comprising in combination, a body having inlet and outlet passages, a main control port therebetween for passing a regulatable and relatively large flow of gas, a bypass between said inlet and outlet passages for passing a relatively small flow of gas, a valve for controlling the rate of flow of gas through said main port, means for supporting and operating said valve to obtain a rapid closing when the gas pressure in the said outlet passage approaches the gas pressure in said inlet passage and to obtain a delayed and slow opening subsequent to a drop in outlet passage pressure relative to inlet passage pressure comprising a diaphragm, a stem for the valve secured to said diaphragm, a spring backing the diaphragm and acting to move said stem to open said valve, a cover for the spring and adjacent side of the diaphragm forming a normally closed chamber over the diaphragm, said valve being slidably supported on said valve stem to permit said diaphragm and valve stem to move toward said cover substantially beyond the position initially closing said valve, a check valve device for permitting quick escape of air pressure from said chamber and thereby permitting rapid closing of said valve, and means for controlling the rate of air flow into said chamber.

3. A step opening gas regulator, comprising in combination, a body having inlet and outlet passages, a main control port therebetween for passing a regulatable and relatively large flow of gas, a bypass between said inlet and outlet passages for passing a relatively small flow of gas, a valve for controlling the rate of flow of gas through said main port, means for supporting and operating said valve to obtain a rapid closing when the gas pressure in the said outlet passage approaches the gas pressure in said inlet passage and to obtain a delayed and slow opening subsequent to a drop in outlet passage pressure relative to inlet passage pressure comprising a diaphragm, a stem for the valve secured to said diaphragm, a spring backing the diaphragm and acting to move said stem to open said valve, a cover for the spring and adjacent side of the diaphragm forming a normally closed chamber over the diaphragm, said valve being slidably supported on said valve stem to permit said diaphragm and valve stem to move toward said cover substantially beyond the position initially closing said valve, a collar mounted on said valve stem to limit the movement of said valve toward said main port, a spring acting to move said valve toward said collar, a check valve device for permitting quick escape of air pressure from said chamber and thereby permitting rapid closing of said valve, and ports located in said check valve whose size and number regulate the rate of slow opening of said valve by controlling the rate of air flow into said chamber.

4. A control for the ignition, regulation, and extinction of gas burners, comprising in combination, a control valve, a body having an inlet passage adapted for connection to a source of gas supply and an outlet passage adapted for connection to a burner through said control valve, a main control port between said inlet and outlet passages for passing a regulatable and relatively large flow of gas, a bypass between said inlet and outlet passages for passing a smaller flow of gas which is sufficient to provide continuous combustion at a burner a valve for closing said main control port, means for supporting and operating said valve to obtain a rapid closing in response to the approach of gas pressure in the said outlet passage to the gas pressure in said inlet passage and to obtain an opening of said port, which is slower than said rapid closing, preceded by a delay in commencing said opening of said port in response to a drop in outlet passage pressure relative to inlet passage pressure.

5. A control for the ignition, regulation, and extinction of gas burners, comprising in combination, a control valve a valve body having an inlet passage adapted for connection to a source of gas supply and an outlet passage adapted for connection to a burner through said control valve, a main control port between said inlet and outlet passages for passing a relatively large flow of gas, a bypass between said inlet and outlet passages for passing a smaller flow of gas, a valve for closing said main control port, means for supporting and operating said valve to obtain a rapid closing when the gas pressure in the said outlet passage approaches the gas pressure in said inlet passage and to obtain a delayed and slow opening subsequent to a drop in outlet passage pressure relative to inlet passage pressure comprising a diaphragm, a stem for the valve secured to said diaphragm, a spring backing the diaphragm and acting to move said stem to open said valve, a cover for the spring and adjacent side of the diaphragm forming a normally closed chamber over the diaphragm, said valve being slidably supported on said valve stem to permit said diaphragm and valve stem to move toward said cover substantially beyond the position initially closing said valve, a check valve device for permitting quick escape of air pressure from said chamber and thereby permitting rapid closing of said valve, and means for controlling the rate of air flow into said chamber.

References Cited in the file of this patent

UNITED STATES PATENTS

| | | |
|---|---|---|
| 788,079 | Wheeler | Apr. 25, 1905 |
| 844,946 | Lowe | Feb. 19, 1907 |
| 1,741,892 | Volkman | Dec. 31, 1929 |
| 2,135,585 | Long | Nov. 8, 1938 |
| 2,314,266 | Beam | Mar. 16, 1943 |
| 2,814,447 | Greenamyer | Nov. 26, 1957 |
| 2,871,879 | Downe et al. | Feb. 3, 1959 |